United States Patent
Kurts et al.

(10) Patent No.: US 7,216,240 B2
(45) Date of Patent: May 8, 2007

(54) APPARATUS AND METHOD FOR ADDRESS BUS POWER CONTROL

(75) Inventors: Tsvika Kurts, Haifa (IL); Doron Orenstien, Haifa (IL); Marcelo Yuffe, Binyamina (IL)

(73) Assignee: Intel Corporation, Santa Clara, CA (US)

( * ) Notice: Subject to any disclaimer, the term of this patent is extended or adjusted under 35 U.S.C. 154(b) by 370 days.

(21) Appl. No.: 10/317,798

(22) Filed: Dec. 11, 2002

(65) Prior Publication Data

US 2004/0117671 A1    Jun. 17, 2004

(51) Int. Cl.
*G06F 1/00* (2006.01)
*G06F 1/32* (2006.01)

(52) U.S. Cl. .................. 713/300; 713/310; 713/320

(58) Field of Classification Search ............... 713/300, 713/310, 323, 400, 320; 365/207, 180 G, 365/194; 710/301
See application file for complete search history.

(56) References Cited

U.S. PATENT DOCUMENTS

| | | | |
|---|---|---|---|
| 4,862,348 A | | 8/1989 | Nakamura |
| 5,432,944 A | | 7/1995 | Nuckolls et al. |
| 5,737,746 A | | 4/1998 | Hardin et al. |
| 5,819,027 A | * | 10/1998 | Budelman et al. ............ 714/47 |
| 5,848,428 A | | 12/1998 | Collins |
| 5,884,088 A | | 3/1999 | Kardach et al. |
| 5,915,121 A | | 6/1999 | Wagner |
| 6,058,059 A | | 5/2000 | Huang et al. |
| 6,073,195 A | * | 6/2000 | Okada ........................ 710/301 |
| 6,076,140 A | | 6/2000 | Dhong et al. |
| 6,141,765 A | * | 10/2000 | Sherman ..................... 713/400 |
| 6,339,552 B1 | * | 1/2002 | Taruishi et al. ........ 365/189.05 |
| 6,597,626 B2 | * | 7/2003 | Hirabayashi ................. 365/233 |
| 6,643,792 B1 | * | 11/2003 | Kurosawa ................... 713/501 |
| 2001/0037421 A1 | | 11/2001 | Singh et al. |
| 2003/0126485 A1 | | 7/2003 | Wilcox et al. |
| 2003/0131125 A1 | | 7/2003 | Ooi |
| 2004/0117670 A1 | | 6/2004 | Kurts et al. |

FOREIGN PATENT DOCUMENTS

| | | |
|---|---|---|
| EP | 0 932 097 A1 | 7/1999 |
| WO | WO 03/058467 A1 | 7/2003 |

OTHER PUBLICATIONS

Snyder, Jeffrey, "New Pentium M Brings Integrated Graphics, I/O to low-Power Embedded Apps", COTS Journal, May 2004, <http://www.cotsjournalonine.com/home/printthis.php?id=1001119, <http://www.cotsjournalonine.com/home/article.php?id=1001119.

(Continued)

*Primary Examiner*—Thomas Lee
*Assistant Examiner*—Suresh K Suryawanshi
(74) *Attorney, Agent, or Firm*—Blakely, Sokoloff, Taylor & Zafman LLP

(57) ABSTRACT

A bus agent is described having a controller to cause assertion of a power signal if an address is to be transferred to a receiving bus agent, the power signal to enable a set of input address sense amplifiers of the receiving agent, prior to the receiving bus agent receiving the address.

30 Claims, 8 Drawing Sheets

OTHER PUBLICATIONS

"Pentium Pro", Wikipedia, the free encyclopedia, Aug. 16, 2005. Retrieved from Internet 092605; <http://en.wikipedia.org/wiki/Pentium_Pro>.

Gochman et al., "The Intel Pentium M Processor: Microarchitecture and Performance", Intel Tech. Journal, vol. 7, Issue 2, May 21, 2003. ISSN 1535-864X.

"Multiprocessing", The Microsoft Press Computer Dictionary, 2nd Edition, 1994, Microsoft Press, ISBN 1-55615-597-2.

"Pentium M", Wikipedia, the free encyclopedia, Sep. 23, 2005. Retrieved from Internet 092605; <http://en.wikipedia.org/wiki/Pentium_M>.

* cited by examiner

APPARATUS AND METHOD FOR ADDRESS BUS POWER CONTROL

RELATED APPLICATION

The present application is related to application entitled "An Apparatus and Method For Data Bus Power Control", filed on Dec. 11, 2002, and assigned application Ser. No. 10/317,776.

FIELD OF THE INVENTION

One or more embodiments of the invention relate generally to the field of integrated circuit and computer system design. More particularly, one or more of the embodiments of the invention relates to a method and apparatus for address bus power control.

BACKGROUND OF THE INVENTION

Communications between devices within a computer system are typically performed using one or more buses that interconnect such devices. These buses may be dedicated buses coupling two devices or non-dedicated buses that are multiplexed by a number of units and devices (e.g., bus agents). Moreover, buses within a computer system may be dedicated to transferring a specific type of information. For example, the x86 microprocessor architecture developed by Intel Corporation of Santa Clara, Calif., includes a three bus system with address, data and control buses for respectively transferring address, data and control signals.

In computer systems employing advanced architectures and processors, such as Pentium®Pro, Pentium®II, Pentium®III or Pentium®4 processors, bus transactions typically occur in a pipelined manner. Specifically, the next memory access may start after a previous transaction request is issued; and all components or phases of a bus transaction are not required to complete before another bus transaction may be initiated. Accordingly, requests from numerous bus agents may be pending at any one time. The pipelining of bus transactions is facilitated by separate data and address buses. When an address of a request is being sent on an address bus, data (or signals) corresponding to an address previously issued on the address bus may be returned on the data bus.

A vast amount of research and system architecture design efforts have been directed to increasing data throughput within computer systems. Technologies such as, data pipelining, out-of-order execution, and the like, enable advanced architectures and processing with significantly higher clock rates and world-class performance.

Furthermore, this research, as well as architecture redesign, has enabled a mobile market for laptop computers, hand held devices, personal digital assistants (PDAs), and the like. Unfortunately, such mobile platforms may be limited to a run time dictated by the life of a battery used by the respective mobile platforms when another power source is not available. Depending on the complexity of the mobile platform, power resources from an attached battery may be depleted within a relatively short amount of time. In part, this is due to the fact that many electronic elements of the platform continue to consume power even when they are not being used.

BRIEF DESCRIPTION OF THE DRAWINGS

The various embodiments of the present invention are illustrated by way of example, and not by way of limitation, in the figures of the accompanying drawings and in which.

DETAILED DESCRIPTION

In the following description, numerous specific details such as logic implementations, sizes and names of signals and buses, types and interrelationships of system components, and logic partitioning/integration choices are set forth in order to provide a more thorough understanding. It will be appreciated, however, by one skilled in the art that the invention may be practiced without such specific details. In other instances, control structures and gate level circuits have not been shown in detail in order not to obscure the invention. Those of ordinary skill in the art, with the included descriptions, will be able to implement appropriate logic circuits without undue experimentation.

Figure 1:
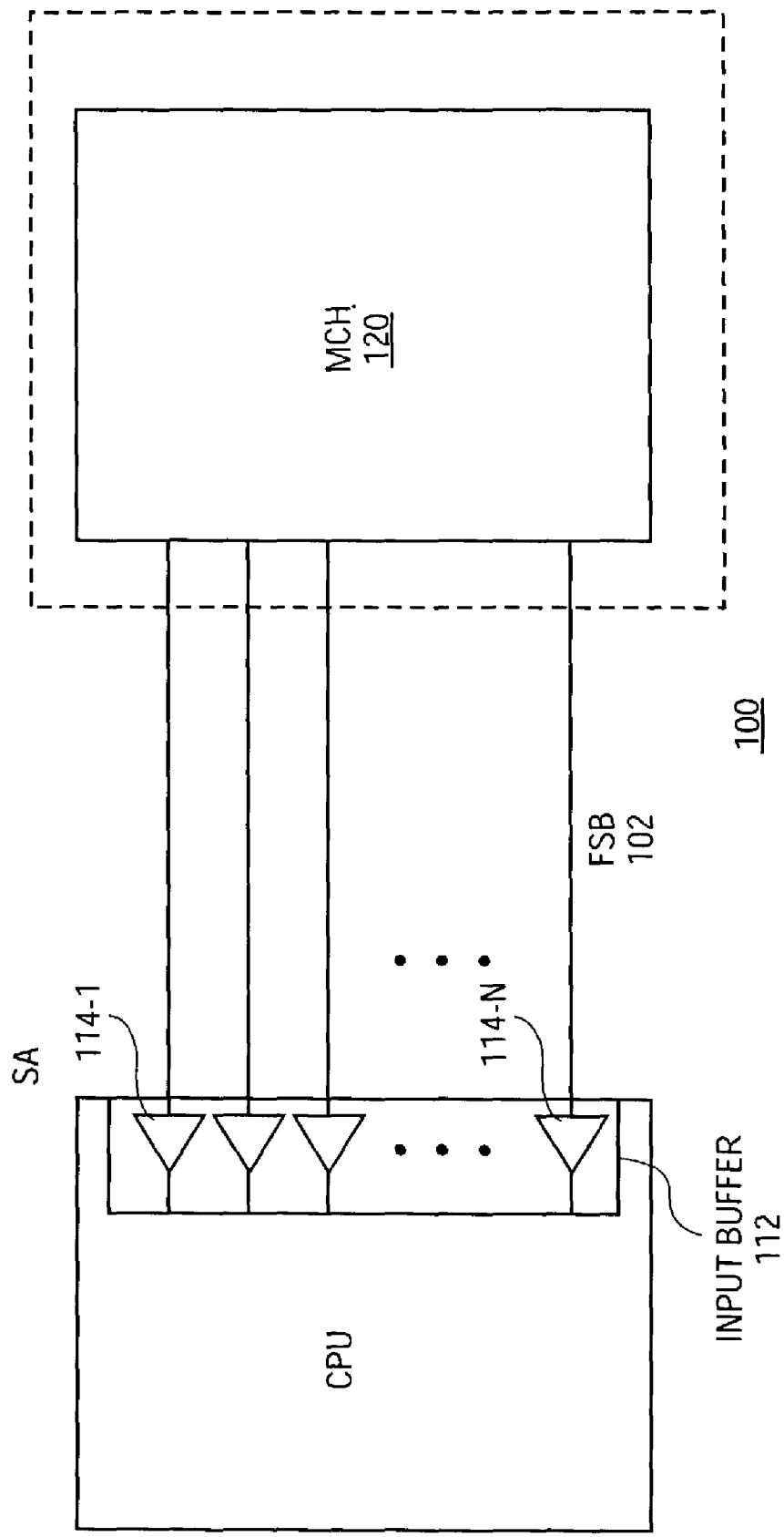
FIG. 1 is a block diagram illustrating a prior processor and memory control hub.

FIG. 1 is a diagram illustrating a prior processor (CPU) 110 and memory controller (MCH) arrangement for an exemplary computer system. As illustrated, CPU 110 may include input buffers 112 that operate to capture data received via data lines of a processor system bus or frontside bus (FSB) 102. The input buffers 112 of CPU 110 include a plurality of address bus input sense amplifiers 114 (114-1, . . . , 114-N) that may be coupled to sense data transmitted to the CPU 110 via a data bus portion of the FSB 102.

For the CPU 110, the data bus input sense amplifiers 114 are continuously enabled following system initialization. While enabled, the data input sense amplifiers 114 consume power.

Figure 2:
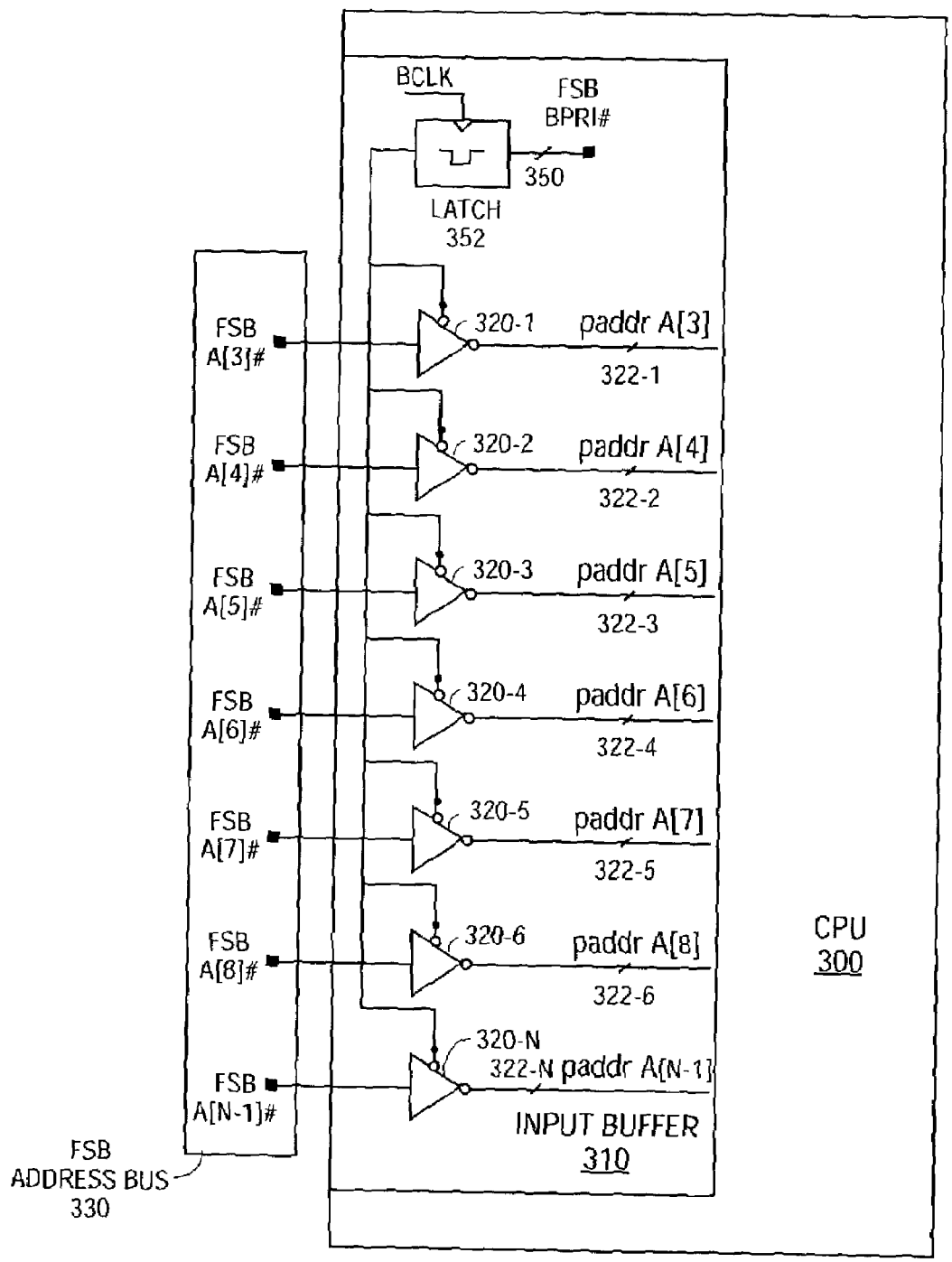
FIG. 2 is a block diagram illustrating a processor having an input buffer in accordance with one embodiment.

Referring now to FIG. 2, a processor (CPU) of one embodiment is described. For the embodiment shown in FIG. 2, the CPU 300 is a mobile platform CPU. It will be appreciated that, for other embodiments, the CPU 300 may be a different type of processor including, for example, a digital signal processor, a graphics processor, an embedded processor, etc.

As illustrated, CPU 300 includes input buffers that are shown collectively as input buffer 310. The input buffer 310 includes N address input sense amplifiers 320 (320-1, . . . , 320-N). The sense amplifiers 320 have outputs coupled to internal address bus signal lines (paddr) 322 (322-1, . . . , 322-N-1). Input buffer 310 may also be coupled to additional internal data and/or control lines. For one embodiment, the sense amplifiers 320 have inputs coupled to a plurality of address lines FSB A[0 ... N−1]# of a front-side bus (FSB) 330.

For one embodiment, the FSB 330 is compatible with the Pentium®4 processor front-side bus protocol, aspects of which are described in copending Singh et al., U.S. patent application no. US 2001/0037421 A1 published Nov. 1, 2001. Where the FSB is compatible with the Pentium 4 processor front-side bus, the FSB 330 includes 64 data lines FSB D[0.63]. For other embodiments, it will be appreciated that the FSB 330 may be compatible with a different bus protocol and/or may include a different number of data lines.

With continuing reference to FIG. 2, for one embodiment, the input buffer 310 further includes a latch 352 that is coupled to receive a bus clock (BCLK) signal and an address bus power control (BPRI#) signal 350 associated with FSB 330. For one embodiment, the BPRI# signal may be received from, for example, a chipset device (not shown) that is further coupled to CPU 300 over the FSB 330. An output of the latch 352 is coupled to enable inputs of each of the address input sense amplifiers 320.

In operation, as the BCLK signal transitions, the latch 352 latches the state of the BPRI# signal. In response to the BPRI# signal being asserted, the address input sense amplifiers 320 of input buffer 310 are enabled to capture an address from FSB 330 via address lines FSB A[0 ... N−1]#. Conversely, in response to the BPRI# signal being deasserted, the input address sense amplifiers are disabled. When the input sense amplifiers are disabled, their power dissipation, primarily thermal dissipation power (TDP) due to a bias current provided by the input buffer, is reduced.

Figure 3:
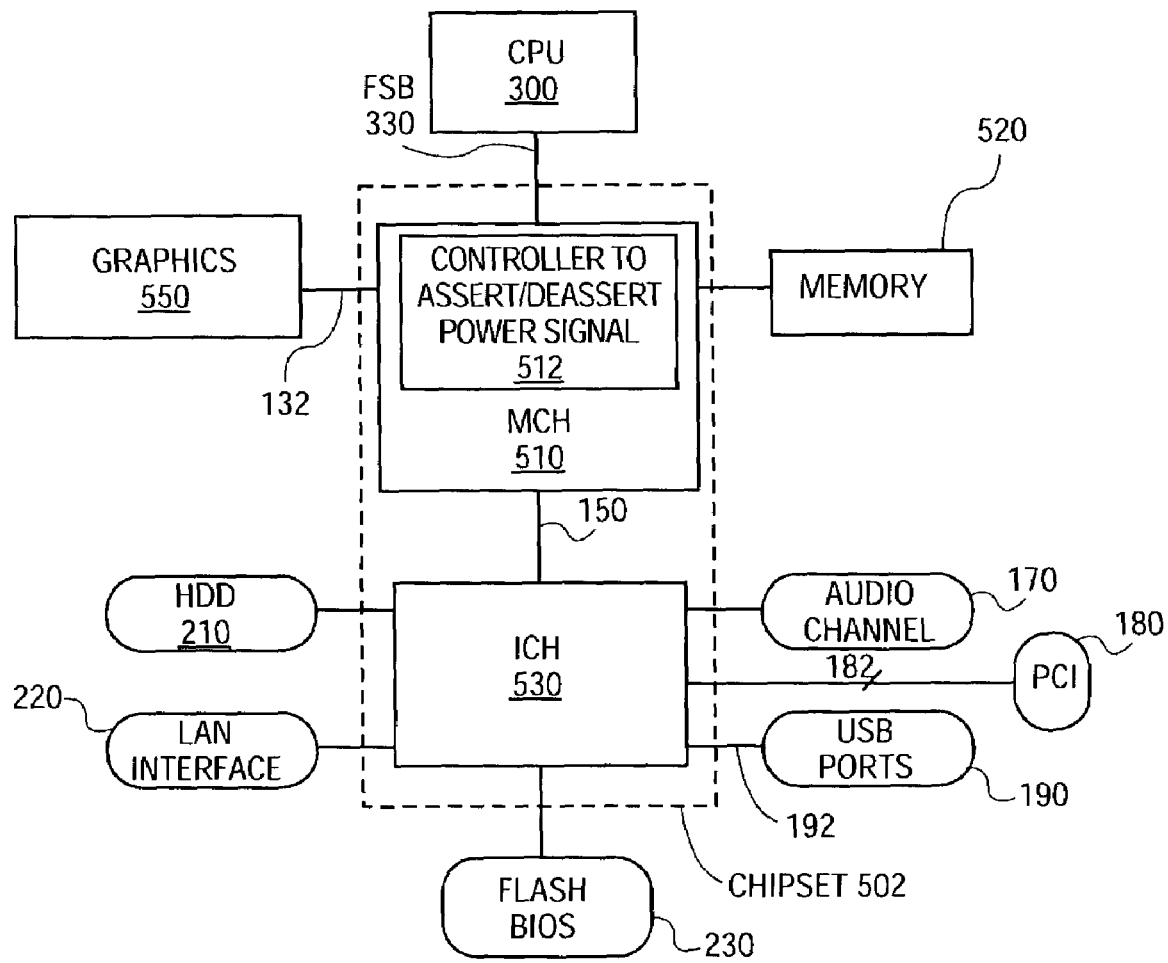
FIG. 3 is a block diagram illustrating a single processor system platform in accordance with one embodiment.

FIG. 3 is a block diagram of computing system 500 of one embodiment in which the CPU 300 of FIG. 2 may be advantageously used. In addition to the CPU 300, the system 500 includes a memory controller, referred to in one embodiment, as a memory control hub (MCH) 510, and an input/output (I/O) controller, referred to in one embodiment, as an I/O control hub (ICH) 530. Together, the MCH 510 and ICH 530 may be referred to as a chipset 502. The MCH 510 is coupled to the CPU 300 via the FSB 330 and to the ICH 530 via bus 150. Also coupled to the MCH 510 is main memory 520 and one or more graphics devices 550. The MCH may also have integrated graphic support (e.g., for use in mobile applications).

An I/O subsystem of the system 500 may include a variety of different types of input and/or output devices coupled to the ICH 530, such as a hard disk drive (HDD) 210, one or more USB ports 190 may be coupled to ICH 530 via a universal serial bus (USB) 192, and/or one or more peripheral component interconnect (PCI)—devices 180 may be coupled to the ICH via a corresponding bus 182. Additionally, for some embodiments one or more audio channels 170 and/or a local area network (LAN) interface 220 may also be coupled to ICH 530.

Implementations with various processors and front-side bus technologies are possible. In an embodiment where the FSB 330 is compatible with the P4 processor front-side bus, the FSB 330 is a pipelined data bus that includes address, data and control portions, which may alternately be referred to herein as address, data and control buses.

Devices coupled to the FSB 330 are also referred to herein as bus agents in reference to the FSB 330. For one embodiment, three types of agents may reside on FSB 330: request agents, response agents, and snoop agents. A request agent is a device that initiates a transaction by issuing a request such as, for example, a memory or I/O read or write request. A response agent is the target of the transaction such as, for example, an I/O target or a memory target. Snoop agents are devices on the bus typically associated with cache memories. For other embodiments, bus agents may be classified in a different manner.

Where the FSB 330 is a pipelined bus, bus transactions may be separated into phases and multiple transactions may overlap. Specifically, all components or phases of a bus transaction are not required to be completed before another bus transaction may be initiated.

As used herein, the term "transaction" designates a bus activity that is related to a single bus access request. A transaction may include several phases, each phase being associated with a specific set of bus signals to communicate a particular type of information. For one embodiment, exemplary phases may include, for example, an arbitration phase, a request phase, a snoop phase, a response phase and/or a data phase.

In the request phase, the requesting agent drives request control and address information on the FSB 330. During a subsequent snoop phase, it is determined, whether sought after data is stored locally and/or whether the transaction is likely to be completed in order with respect to previously issued transactions. In a response phase, a response agent reports to the requesting agent information indicating whether the requested transaction has succeeded or failed. If the requested transaction includes data transfer, a data phase, also referred to as a data transfer phase, may be initiated in response to the assertion of a data ready (DRDY#) signal.

As shown in FIG. 3, in one embodiment, the BPRI# signal discussed above is to be asserted and deasserted by the MCH 510 as part of the FSB 330. In one embodiment, the MCH 510 includes a controller 512 to cause assertion and deassertion of the BPRI# signal. In alternative embodiments, the controller 512 may be provided on other devices/agents coupled to the FSB 330. The manner in which the controller 512 is to cause assertion and deassertion of the BPRI# signal is discussed in more detail below.

Figure 4:
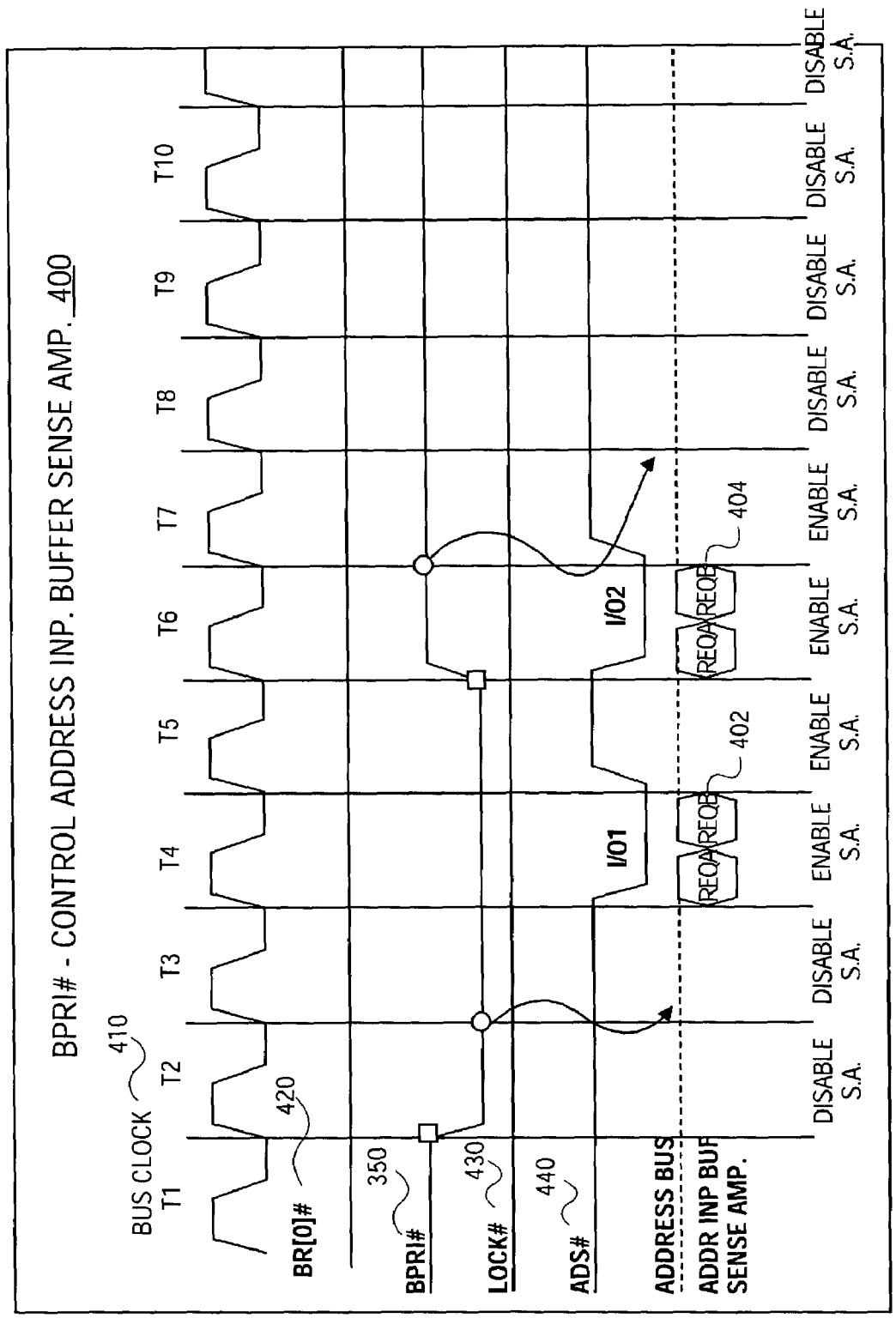
FIG. 4 illustrates a timing diagram in accordance with one embodiment.

In one embodiment, the controller 512 is to cause assertion and deassertion of the BPRI# signal such that the input address sense amplifiers 320 of the CPU 300 are disabled during times that there is no address activity on the FSB 330 and enabled prior to address transfer operations. For one embodiment, the controller is to apply the BPRI# signal in time for the processor to acquire the address information. Said another way, the controller 512 is to cause assertion of the BPRI# signal such that the sense amplifiers 320 of the CPU 300 are enabled in time to sense the address values provided on the FSB 330. Once the address values have been transferred across the FSB 330 to the processor, if there are no upcoming address value transfers within a predetermined timeframe (e.g. a given number of clock periods), the controller 512 is to cause deassertion of the BPRI# signal to reduce power consumption of the sense amplifiers FIG. 4 is a timing diagram illustrating the BPRI# signal for an embodiment that may be used within a computing system (e.g., as observed in FIG. 3). The timing diagram of FIG. 4 shows clock periods T1–T10 of: 1) a bus clock (BCLK) signal 410 that was referred to above with respect to the discussion of FIG. 2; 2) a bus request signal BR[0]# signal 420 that is controlled by the computing system processor; 3) the BPRI# signal 350; 4) a LOCK# signal 430 for locking the bus; 5) an address strobe signal (ADS#) 440; and, 6) a representation of the address values that are presented on the address bus.

For the above signals, a "#" at the end of the signal name indicates that the associated signal is an active low signal (i.e. considered to be asserted when it is at a logic low level).

It will be appreciated that active high signals may be used instead with corresponding changes in associated circuitry to provide similar functionality. Further, for one embodiment, one or more of the FSB 330 signals are low voltage swing signals that have a voltage swing smaller than full swing.

In the example transaction illustrated in FIG. 4, the FSB is "quiet" at clock cycle T1 with respect to the transfer of address values and; as a consequence, the sense amplifiers of the processor are in a disabled, low power consumption state. A controller of the sending bus agent then begins a process for transferring address values to a receiving bus agent over the FSB by causing the assertion of the BPRI # signal 350 in T2. The process may be initiated, for example, if the sending bus agent recognizes that it needs to send a request to the receiving bus agent. Here, the request may be made (e.g., during a request phase of the bus protocol) by presenting address values on the address bus. In one embodiment, the sending bus agent is an MCH (e.g., MCH 512 of FIG. 3); and, the receiving bus agent is a processor (e.g., CPU 300 of FIG. 3). In this case, the MCH may be given a priority agent status so that the MCH can take control of the FSB if the MCH has a need to use the FSB.

In an embodiment, the sending agent (e.g., the MCH 512 of FIG. 3) includes a controller 512 that recognizes a transfer of address values is to be performed (e.g., by recognizing that a request should be sent over the bus); and, as a consequence causes the assertion of the BPRI# signal 350 sufficiently before the address values are to be received by the receiving agent (so that the sense amplifiers of the receiving agent are properly enabled to receive the address values). Here, the receiving bus agent detects the assertion of the BPRI# signal; and, in response, the sense amplifiers are enabled. As such, more generally, the controller is to cause the assertion of a power signal (e.g., the BPRI# signal of FIG. 4); which, in turn, causes the sense amplifiers of a receiving agent to become enabled.

In the embodiment of FIG. 4, the receiving bus agent begins to enable its sense amplifiers on the next clock cycle following the clock cycle in which the BPRI# signal 350 was asserted. A full clock cycle is consumed (clock cycle T3) in order to ensure that the sense amplifiers will properly receive address values from the FSB. That is, according to the embodiment of FIG. 4, the BPRI# signal 350 is latched by the receiving bus agent on the clock edge between clock cycles T2 and T3. In response to detection of the BPRI# signal by the receiving agent, the receiving agent enables the sense amplifiers. The sense amplifiers are then given the full, following clock cycle (clock cycle T3) to become sufficiently enabled to receive address values from the sending bus agent. Because of the transition from disabled to enabled that occurs in clock cycle T3, the sense amplifiers are regarded as "disabled" in clock cycle T3. At clock cycle T4 of the embodiment of FIG. 4, the sending bus agent presents the address values of the FSB (as signified by "Req A" and "Req B" in FIG. 4) with the assertion of the address strobe signal (ADS#) 440.

As a consequence, in the embodiment of FIG. 4, the Req A and Req B address values are latched into the receiving bus agent through the sense amplifiers on appropriately positioned clock edges (e.g., the falling edge of bus clock 410 during clock cycle T4 to latch the Req A values; and, the rising edge of bus clock 410 between clock cycles T4 and T5 to latch the Req B values). The sending bus agent also de-asserts the address strobe 440 during clock cycle T5 so that an immediately following, transfer of address values ("Req A" and "Req B" during cycle T6) can be clearly delineated from the address value transfer that occurred during clock cycle T4. The address strobe 440 is then re-asserted during clock cycle T6 to effect the second address value transfer.

Note that, in the embodiment of FIG. 4, the controller 512 of the sending agent causes the de-assertion of the BPRI# signal 350 with the re-assertion of the address strobe signal 440 during clock cycle T6. In an embodiment, the controller of the sending bus agent (e.g., the aforementioned controller such as the controller 512 of FIG. 3) is designed to: 1) recognize that a "next" transfer of address values is not going to occur for at least some time period (e.g., a number of clock cycles beyond the "current" transfer of address values (the "current" transfer, at clock cycle T6, being the second transfer of Req A and Req B values)); and, 2) as a consequence, cause the de-assertion of the BPRI# signal 350 so as to disable the sense amplifiers shortly after the current address value transfer is received by the receiving bus agent. Here, again, in an embodiment the controller recognizes whether or not a "next" transfer address is to going to occur by monitoring whether or not a request needs to be made over the FSB. That is, requests are presented on the bus by placing address values of on the address bus portion of the FSB.

In the example of FIG. 4, it is recognized as of clock cycle T6 that another transfer of address values does not follow the "T6" transfer for at least four clock cycles (because, as seen in FIG. 4, no address value transfers occur between clock cycles T6 and T10); and, as a consequence, the controller 512 causes the de-assertion of the BPRI# signal to be de-asserted at clock cycle T6. It will be appreciated that, for other embodiments, a different number of clock periods or another measure of time between subsequent address transfers may be used to cause the de-assertion of the BPRI# signal 440.

Figure 5:
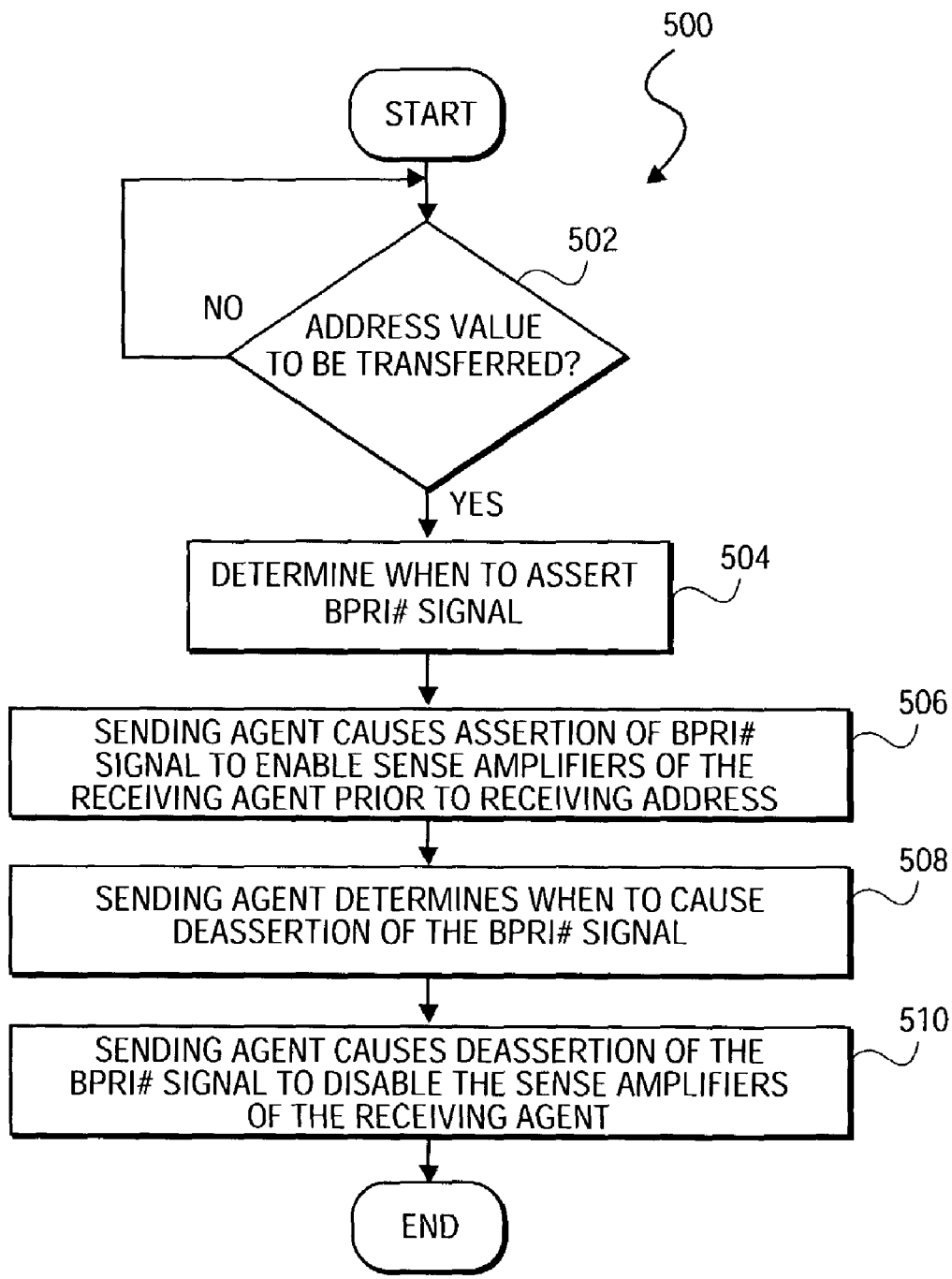
FIG. 5 illustrates a flow chart in accordance with one embodiment.

A method for address bus power control is described in the flow chart 500 illustrated in FIG. 5. At process block 502, a sending agent (e.g., the MCH) detects an address is to be transferred to the receiving agent (e.g., processor). At process block 504, the sending agent determines when to assert the BPRI# signal. At process block 506, the sending agent causes assertion of the BPRI# signal to enable the sense amplifiers of the receiving agent to receive the address.

At process block 508 the sending agent determines when to cause the deassertion of the BPRI# signal, based on the completion of the address transfer to the receiving agent. At process block 510, the sending agent causes the deassertion of the BPRI# signal which causes the address input sense amplifiers of the receiving agent to be disabled.

Figure 6:
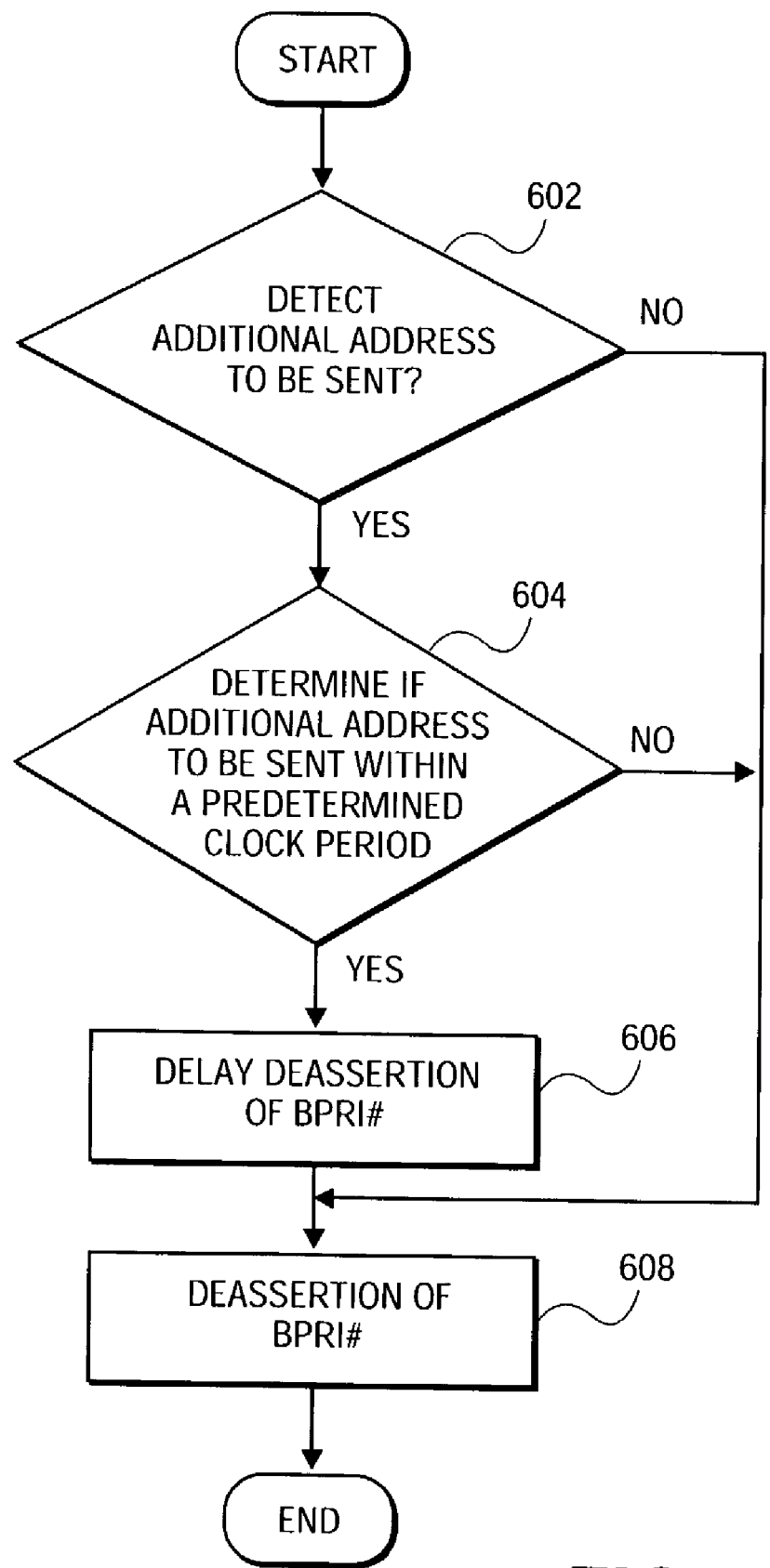
FIG. 6 illustrates a flow chart in accordance with one embodiment.

FIG. 6 depicts a flow chart 600 illustrating an additional technique for causing the deassertion of the address bus power control signal BPRI#, in accordance with one embodiment. At process block 602 the sending agent determines whether an additional address (an additional address with respect to the current address being transferred to the receiving agent) will be sent to the receiving agent. If such an additional address is not detected, at process block 608 the address bus power control signal BPRI# is caused to be deasserted, following completion of the current address transfer, to disable the address input sense amplifiers of the receiving agent.

Conversely, if the sending agent detects an additional address is to be transferred to the receiving agent, in processing block 604 the sending agent determines if the additional address is to be sent to the receiving agent within a predetermined clock period. If the additional address is to be transferred beyond the predetermined clock period, at process block 608 the address bus power control signal BPRI# is caused to be deasserted, following completion of the current address transfer, to disable the address input sense amplifiers of the receiving agent.

If the additional address is to be transferred within the predetermined clock period, at process block 606 the sending agent delays deasserting the address bus power control signal BPRI#, to have the address input sense amplifiers continue to be enabled. At process block 608, the sending agent deasserts the BPRI # signal to disable the address sense amplifiers of the receiving agent following completion of the additional address transfer, to disable the address input sense amplifiers of the receiving agent.

Figure 7:
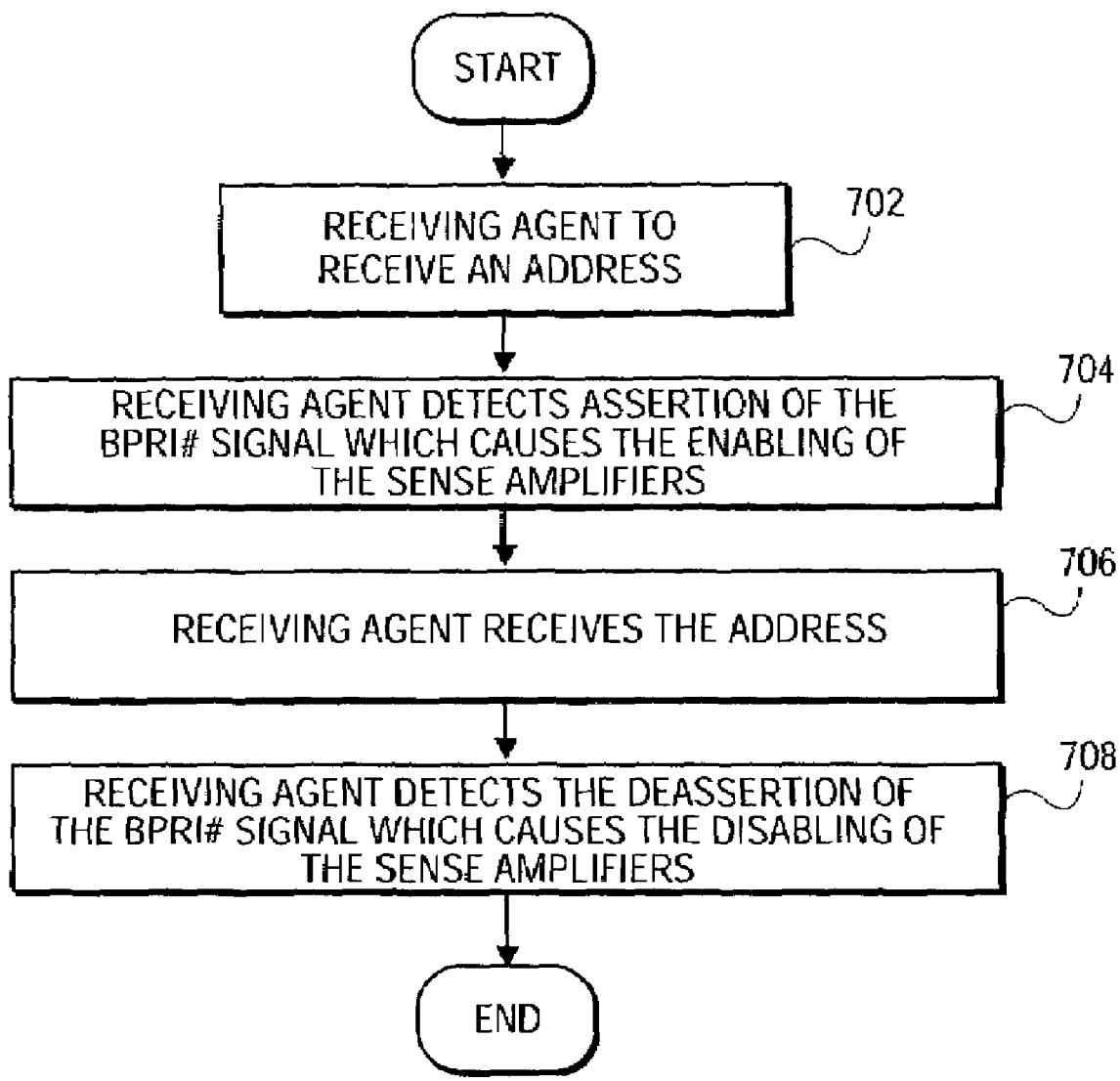
FIG. 7 illustrates a flow chart in accordance with one embodiment.

A method for data bus power control is described in the flow chart 700 illustrated in FIG. 7. In process block 702, the receiving agent (e.g., a CPU) is to receive an address from a separate agent. In process block 704, prior to receiving the address, the receiving agent detects assertion of the BPRI# signal, which causes the address input sense amplifiers of the receiving agent to be enabled to receive the address. In process block 706, the receiving agent receives the address. In process block 708, the receiving agent detects the deassertion of the BPRI# signal, which causes the disabling of the address input sense amplifiers of the receiving agent to reduce power consumption.

Figure 8:
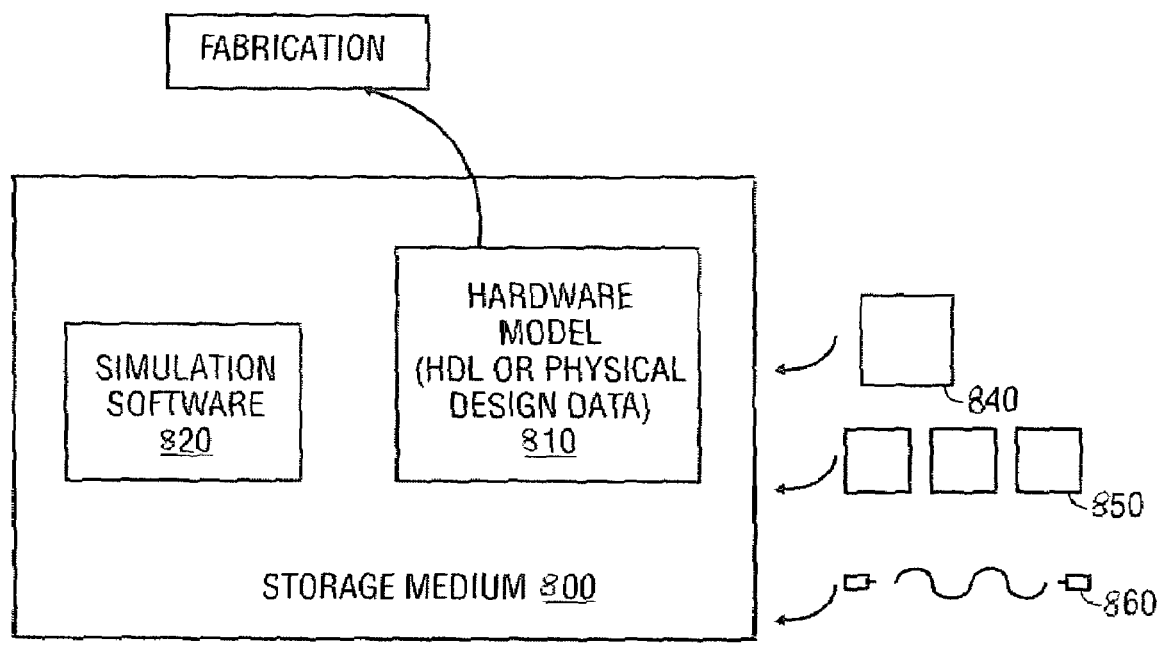
FIG. 8 is a block diagram illustrating various design representations or formats for simulation, emulation and fabrication of a design using the disclosed techniques.

FIG. 8 is a block diagram illustrating various design representations or formats for simulation, emulation and fabrication of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 810 may be stored in a storage medium 800, such as a computer memory, so that the model may be simulated using simulation software 820 that applies a particular test suite 830 to the hardware model to determine if it indeed functions as intended. In some embodiments, the simulation software is not recorded, captured or contained in the medium.

Additionally, a circuit level model with logic and/or transistor gates may be produced at some stages of the design process. The model may be similarly simulated some times by dedicated hardware simulators that form the model using programmable logic. This type of simulation taken a degree further may be an emulation technique. In any case, reconfigurable hardware is another embodiment that may involve a machine readable medium storing a model employing the disclosed techniques.

Furthermore, most designs at some stage reach a level of data representing the physical placements of various devices in the hardware model. In the case where conventional semiconductor fabrication techniques are used, the data representing the hardware model may be data specifying the presence or absence of various features on different mask layers or masks used to produce the integrated circuit. Again, this data representing the integrated circuit embodies the techniques disclosed in that the circuitry logic and the data can be simulated or fabricated to perform these techniques.

In any representation of the design, the data may be stored in any form of a machine readable medium. An optical or electrical wave 860 modulated or otherwise generated to transport such information, a memory 850 or a magnetic or optical storage 840, such as a disk, may be the machine readable medium. Any of these mediums may carry the design information. The term "carry" (e.g., a machine readable medium carrying information) thus covers information stored on a storage device or information encoded or modulated into or onto a carrier wave. The set of bits describing the design or a particular of the design are (when embodied in a machine readable medium, such as a carrier or storage medium) an article that may be sealed in and out of itself, or used by others for further design or fabrication.

ALTERNATE EMBODIMENTS

It will be appreciated that, for other embodiments, a different system configuration may be used. For example, while the system 500 includes a single CPU 300, for other embodiments, a multiprocessor system (where one or more processors may be similar in configuration and operation to the CPU 300 described above) may benefit from the address bus power control approach of various embodiments. Further different type of system or different type of computer system such as, for example, a server, a workstation, a desktop computer system, a gaming system, an embedded computer system, a blade server, etc., may be used for other embodiments.

Having disclosed exemplary embodiments, modifications and variations may be made to the disclosed embodiments while remaining within the scope of the embodiments of the invention as defined by the following claims.

What is claimed is:

1. A bus agent comprising:
a controller coupled to an external bus to cause assertion of a power control signal if an address is to be transferred to a separate bus agent coupled to the external bus, the power control signal to enable a set of input address sense amplifiers of the separate bus agent, prior to the separate bus agent receiving the address, wherein the controller is also to cause de-assertion of the power control signal to disable the sense amplifiers once the address has been received by the separate bus agent.

2. The bus agent of claim 1, wherein the controller is also to cause the de-assertion of the power control signal to disable the sense amplifiers after the address has been received if no additional address value is scheduled to be sent within a predetermined number of clock periods.

3. The bus agent of claim 1, wherein the bus agent is a chipset.

4. The bus agent of claim 1, wherein the bus agent is a memory controller.

5. The bus agent of claim 1, wherein the separate bus agent is a processor.

6. A bus agent comprising:
an interface to a bus, the interface to cause assertion of a power control signal if the bus agent is to place an address on the bus, the power control signal to allow a set of input address sense amplifiers of a separate bus agent on the bus to receive the address, wherein the interface is also to cause the de-assertion of the power control signal to disable the sense amplifiers once the address has been received by the separate bus agent.

7. The bus agent of claim 6, wherein the interface is also to cause delay of the de-assertion of the power control signal to disable the sense amplifiers after the address has been received if at least one additional address is scheduled to be sent within a predetermined number of clock periods.

8. The bus agent of claim 7, wherein the predetermined number of clock periods is at least 2 clock periods.

9. The bus agent of claim 6, wherein the bus agent is a chipset.

10. The bus agent of claim 6, wherein the bus agent is a memory controller.

11. The bus agent of claim 7, wherein the separate bus agent is a processor.

12. A bus agent comprising:
an input buffer having a set of input address sense amplifiers; and
the sense amplifiers are coupled to a power control signal, the sense amplifiers are caused to be enabled to receive an address from an external bus agent in response to assertion of the power control signal by the external bus agent, prior to the bus agent receiving an address.

13. The bus agent of claim 12, wherein the input address sense amplifiers are caused to be disabled after the bus agent has received the address in response to de-assertion of the power control signal.

14. The bus agent of claim 12, wherein the bus agent is a processor.

15. The bus agent of claim 12, wherein the external bus agent is a chipset.

16. The bus agent of claim 12, wherein the external bus agent is a memory controller.

17. The bus agent of claim 12, wherein the sense amplifiers are caused to be enabled to receive an address from the external bus agent in response to assertion of the power control signal at least two clock periods prior to the bus agent receiving the address.

18. A method comprising:
recognizing, by a bus agent, that an address is to be transferred over a bus;
asserting a power control signal to enable a set of input address sense amplifiers of a separate bus agent on the bus, prior to the separate bus agent receiving the address; and
de-asserting the power control signal to disable the set of input address sense amplifiers after completion of the address transfer.

19. The method of claim 18, further comprising delaying the de-asserting of the power control signal to disable the set of input address sense amplifiers after completion of an address transfer if an address is scheduled to be sent to the separate bus agent within a predetermined number of clock periods.

20. The method of claim 18, wherein the asserting the power control signal includes asserting the power signal at least two clock periods prior to an address delivery period.

21. The method of claim 18, wherein the method is performed by a chipset.

22. The method of claim 18, wherein the method is performed by a memory controller.

23. The method of claim 18, wherein the separate bus agent is a processor.

24. An article comprising a machine readable carrier medium carrying data which, when loaded into a computer system memory in conjunction with simulation routines, provides functionality of a model comprising:
a controller, coupled to an external bus, to cause assertion of a power control signal if an address is to be transferred to a separate bus agent coupled to the external bus, the power control signal to enable a set of input address sense amplifiers of the separate bus agent, prior to the separate bus agent receiving the address, wherein the controller is also to cause de-assertion of the power control signal to disable the sense amplifiers once the address has been received by the separate bus agent.

25. The article of claim 24, wherein the controller is also to cause the de-assertion of the power control signal to disable the sense amplifiers after the address has been received if no additional address value is scheduled to be sent within a predetermined number of clock periods.

26. The article of claim 24, wherein the bus agent is a chipset.

27. The article of claim 24, wherein the bus agent is a memory controller.

28. The bus agent of claim 1, wherein the separate bus agent is a processor.

29. A system comprising:
an external bus;
a chipset coupled to the external bus, comprising:
a controller to cause assertion of a power control signal if an address is to be transferred to a processor, the controller to cause de-assertion of the power control signal to disable the set of input address sense amplifiers after completion of an address transfer; and
the processor coupled to the external bus, comprising:
an input buffer having a set of input address sense amplifiers, the sense amplifiers are coupled to the power control signal, the sense amplifiers are caused to be enabled to receive an address from the chipset in response to assertion of the power signal, prior to the processor receiving the address.

30. The system of claim 29, wherein the controller of the chipset is to cause de-assertion of the power control signal to disable the set of input address sense amplifiers after completion of the address transfer and if no address is scheduled to be sent to the requesting agent within a predetermined clock period.

* * * * *

UNITED STATES PATENT AND TRADEMARK OFFICE
CERTIFICATE OF CORRECTION

| | | |
|---|---|---|
| PATENT NO. | : 7,216,240 B2 | Page 1 of 1 |
| APPLICATION NO. | : 10/317798 | |
| DATED | : May 8, 2007 | |
| INVENTOR(S) | : Kurts et al. | |

It is certified that error appears in the above-identified patent and that said Letters Patent is hereby corrected as shown below:

In column 9, at line 1, delete "7," and insert --6,--.

Signed and Sealed this

Fifteenth Day of April, 2008

JON W. DUDAS
*Director of the United States Patent and Trademark Office*